United States Patent [19]

Ohno

[11] Patent Number: 4,497,639

[45] Date of Patent: Feb. 5, 1985

[54] SILICON CARBIDE CUTTING INSERT WITH PRE-PRESSED CORE CENTER PIECE AND SINTERED DIAMOND ENVELOPE

[75] Inventor: John M. Ohno, Plymouth, Mich.

[73] Assignee: General Electric Company, Detroit, Mich.

[21] Appl. No.: 331,370

[22] Filed: Dec. 16, 1981

[51] Int. Cl.³ .............................................. C04B 31/16
[52] U.S. Cl. ...................................... 51/307; 51/298; 264/60
[58] Field of Search ..................... 51/307, 298; 264/60

[56] References Cited

U.S. PATENT DOCUMENTS

| | | | |
|---|---|---|---|
| 2,938,807 | 5/1960 | Anderson | 106/44 |
| 3,816,081 | 6/1974 | Hale | 75/203 |
| 4,018,631 | 4/1977 | Hale | 148/31.5 |
| 4,063,909 | 12/1977 | Mitchell | 51/309 |
| 4,124,401 | 11/1978 | Lee et al. | 51/307 |
| 4,151,686 | 5/1979 | Lee et al. | 51/307 |
| 4,167,399 | 9/1979 | Lee et al. | 51/307 |
| 4,173,614 | 11/1979 | Lee et al. | 51/307 |
| 4,219,339 | 8/1980 | Wilson | 51/307 |
| 4,220,455 | 9/1980 | St. Pierre et al. | 51/295 |
| 4,220,677 | 9/1980 | Fedoseev et al. | 427/215 |
| 4,238,433 | 12/1980 | Hillig | 264/60 |
| 4,242,106 | 12/1980 | Morelock | 51/307 |
| 4,247,304 | 1/1981 | Morelock | 51/295 |
| 4,268,582 | 5/1981 | Hale et al. | 428/466 |

FOREIGN PATENT DOCUMENTS 2006733  5/1979  United Kingdom .

OTHER PUBLICATIONS

European Patent Application, 010,257, Sep. 1980.
European Patent Application, 012,966, Jul. 1980.

Primary Examiner—James Derrington
Attorney, Agent, or Firm—Hedman, Gibson, Costigan & Hoare

[57] ABSTRACT

A silicon carbide cutting insert is prepared using a pre-pressed core dispersion of carbon fiber, carbon black, and filler in a temporary binder such as paraffin. The pre-pressed core dispersion is enveloped with a dispersion of super-hard crystals and carbon black in the temporary binder and compacted with the pre-pressed core to form an intermediate composite which is subsequently heated to allow for the removal of the temporary binder and the infiltration of liquefied silicon. The composite is then sintered to form a matrix of silicon and silicon carbide throughout the cutting insert.

9 Claims, 2 Drawing Figures

4,497,639

SILICON CARBIDE CUTTING INSERT WITH PRE-PRESSED CORE CENTER PIECE AND SINTERED DIAMOND ENVELOPE

BACKGROUND OF THE INVENTION

The present invention is directed to the silicon carbide cutting inserts of the type produced in accordance with teachings of U.S. patent application Ser. Nos. 167,019 and 167,196, both filed July 9, 1980, both abandoned in favor of co-pending continuation application Ser. Nos. 313,241, now U.S. Pat. No. 4,428,755, and 312,987, now U.S. Pat. No. 4,417,906, respectively, both by Dr. John M. Ohno, and assigned to the assignee of the present invention, the entire disclosures of which are hereby incorporated by reference.

The above-mentioned patents disclose a straight-forward technique (hereinafter referred to as the "press and treat" technique) for forming high quality cutting inserts, which readily lends itself to mass production techniques. Very briefly, the press and treat technique involves the preparation of a first or crystal dispersion of super-hard crystals such as diamond or cubic boron nitride crystals in carbon black and a second or core dispersion of carbon black, carbon fiber and filler material (super-fine $\beta$-silicon carbide). The two dispersions are individually mixed with a small amount of temporary binder such as paraffin to lend a sufficient green strength to the two dispersions upon cold compaction thereof. After compacting the two dispersions together in a desired configuration, the compact is vacuum heated in the presence of silicon to burn off the paraffin and to allow the silicon to infiltrate both dispersions. Upon further heating, and without the need for the constant application of any type of pressure to the insert, the silicon reacts with the carbon black to form a $\beta$-silicon carbide and silicon matrix which bonds both dispersions both internally and to each other.

The dispersions may be compacted in a number of ways, several of which are disclosed in co-pending U.S. patent application Ser. Nos. 226,604, now abandoned; 286,613; 331,381, now U.S. Pat. No. 4,448,591, the entire disclosures of which are hereby incorporated by reference, as well as the above-mentioned pending patent applications. For example, the Ser. No. 167,196, now abandoned, the two dispersions are compacted at the same time to provide a first dispersion which completely overlies the second dispersion. In Ser. No. 167,019, now abandoned, on the other hand, a two step compaction technique is employed such that the super-hard crystal dispersion is only disposed along the periphery of the lightly prepressed core. In Ser. Nos. 226,604 now abandoned, and 286,613, multi-step processes are employed to provide particular configurations for the inserts. None of the above compaction techniques are employed to provide any type of warpage compensation.

In most applications it is necessary that the insert produced by the press and treat technique be mounted upon a carbide substrate, such as tungsten carbide in order to lend strength to the cutting insert. The applications include high speed machining, or interrupted machining of Al-Si alloy, Cu alloy, ceramic, fiberglass reinforced plastics, graphite, pre-sintered carbide, etc. It is therefore of paramount importance that the inserts so produced have a high degree of flatness on their lower surfaces in order to provide a secure bond to the carbide substrate.

It has been found, however, that for a wafer type composite, the amount of warpage of the lower surface during sintering renders the bonding of the wafer to the carbide substrate difficult or inadequate regardless of the bonding technique.

SUMMARY OF THE INVENTION

It is therefore an object of the present invention to provide a new compaction process which reduces the amount of warpage which may occur during sintering of composite wafer produced according to the press and treat technique.

It is a further object of the present invention to provide a new compaction process for producing a cutting insert, the process including the use of a prepressed core dispersion.

It is a further object of the present invention to provide a new compaction technique employing a pre-pressed core dispersion for a cutting insert produced in accordance with the press and treat technique, the new compaction technique reducing warpage of the insert during sintering, reducing the amount of diamond material required for the insert, facilitating the formation of the diamond dispersion as an envelope about the pre-pressed core, and providing a strengthened cutting edge.

It is a further object of the present invention to provide an intermediate composite of unique design adapted to be infiltrated by liquefied silicon and sintered to produce a cutting insert.

In accordance with a first aspect of the present invention, a process for producing a cutting insert includes preparing a crystal dispersion of super-hard crystals, such as diamond or cubic boron nitride crystals, and carbon black in temporary binder, preparing a core dispersion of carbon fiber, carbon black and filler in a temporary binder, pre-pressing the core dispersion to form a pre-pressed core, enveloping the pre-pressed core with the diamond dispersion, compacting the crystal dispersion with the pre-pressed core to form an intermediate composite, heating the intermediate composite to allow for the removal of the temporary binder and the infiltration of liquefied silicon into the intermediate composite and sintering the intermediate composite to produce the cutting insert.

More specifically, the core dispersion is pre-pressed at approximately 8–10 tons per square inch, while the crystal dispersion is compacted along with the pre-pressed core at approximately 30–45 tons per square inch. The crystal dispersion is formed so as to produce approximate percentage weights of more than 79, 6–9, 8–12 and less than 0.2 for the super-hard crystals, $\beta$-silicon carbide, and elemental silicon and carbon, respectively, in the crystal dispersion after sintering. Further, the core dispersion is produced so as to provide approximate percentage weights of 45–65, 25–45, 8–12, and less than 0.8 for the filler, $\beta$-silicon carbide and elemental silicon and carbon, respectively, in the core dispersion after sintering. More particularly, the super-hard crystals may be comprised of diamond crystals and the filler may be comprised of super fine silicon carbide.

In accordance with a first embodiment of the invention, the cutting insert may be provided with a brazable layer containing cobalt compounds adjacent to the pre-pressed core, the composite being brazed onto a carbide substrate at the brazable layer. In accordance with a second embodiment of the invention, the composite may simply be bonded to a carbide substrate through the use of a high temperature polymer adhesive.

In accordance with a second aspect of the present invention, an intermediate composite adapted to be infiltrated by liquefied silicon and sintered to produce a cutting insert includes a pre-pressed core dispersion of carbon fiber, carbon black and filler in a temporary binder compressed at a first pressure, and a crystal dispersion of super-hard crystals, such as diamond or cubic boron nitride crystals, in carbon black in a temporary binder. The crystal dispersion envelopes the pre-pressed core dispersion and is compressed therewith at a second pressure greater than the first pressure to form the intermediate composite.

BRIEF DESCRIPTION OF THE DRAWINGS

These and other objects, aspects and embodiments of the invention will be described with reference to the following drawing figures of which.

DETAILED DESCRIPTION OF THE INVENTION

Figure 1:
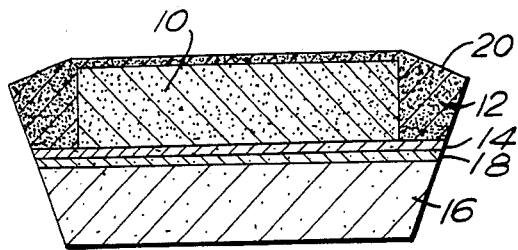
FIG. 1 illustrates the cutting insert produced in accordance with the present invention mounted on a carbide substrate.

FIG. 1 illustrates the cutting insert having a pre-pressed core dispersion 10 enveloped by a crystal (diamond or cubic boron nitride) dispersion layer 12 produced in accordance with the press and treat techniques disclosed Ser. Nos. 167,019, now abandoned, and 167,196, now abandoned. Further, the cutting insert illustrated in FIG. 1 is further provided with a thin layer of material 14 containing cobalt, cobalt compounds, and silicon carbide produced in accordance with the teachings disclosed in co-pending U.S. patent application Ser. No. 331,377, the entire disclosure of which is hereby incorporated by reference, layer 14 allowing the cutting insert to be brazed onto carbide substrate 16. A standard junction layer 18, such as Easy-Flow is provided on the surface of carbide substrate 16 to facilitate the brazing of the cutting insert onto the substrate. Alternatively, layers 14 and 18 may be omitted, and the insert bonded to the carbide substrate 16 through the use of an adhesive.

The crystal dispersion layer 12 of the cutting insert illustrated in FIG. 1 includes a K-land contour 20 which is provided to strengthen the cutting edge. However, it will be appreciated that any particular contour for the crystal dispersion layer 12 may be provided as desired.

Figure 2:
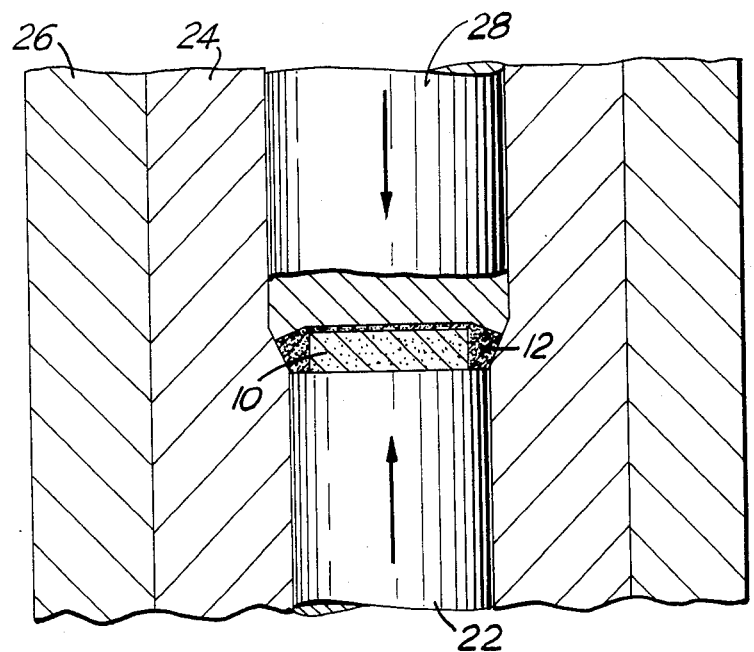
FIG. 2 is an illustration of the technique for forming a portion of the cutting insert in accordance with the present invention.

The process for producing the relevant portion of the cutting insert illustrated in FIG. 1 will now be described with further reference to FIG. 2. Initially, the core dispersion 10, formed of carbon black, carbon fiber, filler material and paraffin is blended as disclosed in Ser. No. 167,196, now abandoned, and is pre-pressed at approximately 8-10 tons per square inch to form core dispersion 10. The pre-pressed core dispersion 10 is then placed on the thin layer 14 or directly on bottom carbide plunger 22 within a mold formed by carbide mold wall 24 and steel support 26. The crystal dispersion 12, also formed in accordance with the teachings of Ser. No. 167,196, now abandoned, is loaded into the mold in sufficient amounts to insure that the crystal dispersion completely envlops the pre-pressed core dispersion 10.

After loading the crystal dispersion, the layer 12 is compacted (or layers 12 and 14), and the pre-pressed core dispersion 10 further compacted together by upper carbide plunger 28 at approximately 30-45 tons per square inch.

It is desirable to provide the bottom surface of the cutting insert with the contour disclosed in copending U.S. patent application Ser. No. 331,377, to further compensate for warpage of the insert.

The Table shown below illustrates a working example of the weight percentage of the constituent elements and compounds contained in crystal dispersion layer 12, pre-pressed center piece 10, and cobalt containing layer 14.

TABLE

| Area | | Composition (% by Weight) | | |
|---|---|---|---|---|
| | | $\beta$SiC | Free Carbon | Free Silicon |
| 12 | 79 Diamond | 6-9 | <0.2 | 8-12 |
| 10 | 45-65$\alpha$SiC (Filler) | 25-45 | <0.8 | 8-12 |
| 14 | 35-40 Co | 45-50 | <0.8 | 8-12 |

The use of the pre-pressed core dispersion helps reduce warpage of the composite during sintering, thus facilitating the application of the composite onto a carbide substrate with or without layer 14. Also, the amount of crystal material required in crystal dispersion 12 is reduced, and the loading of the crystal dispersion powder into the mold in the appropriate areas is facilitated through the use of the pre-pressed core dispersion. Finally, use of the pre-pressed core dispersion may be readily employed to produce any particular contour of the cutting surface of the insert, such as the K-land contour illustrated in the FIGURES.

The insert thus produced by the technique disclosed herein is considerably less expensive than the commercially available diamond inserts, may be fully indexable thus leading to wider applications for the insert. The inserts produced in accordance with the present invention may be used for high speed machining and machining of Al-Si alloy, Cu alloy, ceramics, fiberglass reinforced plastics, graphite, pre-sintered carbide, etc. Further, the cutting insert disclosed herein may be produced according to the press and treat technique without time consuming and expensive high pressure sintering. With the use of the pre-pressed core, the pressing of compacts can readily be automated, as disclosed in co-pending U.S. patent application Ser. No. 331,376, by Dr. John M. Ohno, filed concurrently herewith, and assigned to the assignee of the present invention, the entire disclosure of which is hereby incorporated by reference.

Although the preferred embodiments and examples of the present invention have been described with reference to the foregoing specification and drawings, the scope of the invention will now be described with reference to the following claims.

What is claimed is:

1. A process for producing a cutting insert comprising:
    preparing a crystal dispersion of superhard crystals selected from the group consisting of diamond and cubic boron nitride crystals, and carbon black in a temporary binder;
    preparing a core dispersion of carbon fiber, carbon black and filler in a temporary binder;
    pre-pressing said core dispersion at a first pressure to form a pre-pressed core;

enveloping said pre-pressed core with said crystal dispersion;

compacting said crystal dispersion with said pre-pressed core at a second pressure greater than said first pressure to form an intermediate composite;

heating said intermediate composite to allow for the removal of said temporary binder and the infiltration of liquified silicon into said intermediate composite; and sintering said intermediate composite to produce said cutting insert.

2. The process of claim 1 wherein said core dispersion is pe-pressed at approximately 8-10 tons/in$^2$.

3. The process of claim 2 wherein said crystal dispersion is compacted with said pre-pressed core at approximately 30-45 tons/in$^2$.

4. The process of claim 1 further comprising forming said crystal dispersion so as to produce approximate percentage weights of >79, 6-9, 8-12 and <0.2 for said super-hard crystals, $\beta$-silicon carbide and elemental silicon and carbon, respectively, in said crystal dispersion after sintering.

5. The process of claim 4 wherein said super-hard crystals are diamond crystals.

6. The process of claim 4 further comprising forming said core dispersion so as to produce approximate percentage weights of 45-65, 25-45, 8-12, and less than 0.8 for said filler, $\beta$-silicon carbide and elemental silicon and carbon, respectively, in said core dispersion after sintering.

7. The process of claim 6 wherein said filler comprises super fine silicon carbide.

8. The process of claim 1 further comprising providing a brazable layer adjacent said pre-pressed core, and brazing said cutting insert to a carbide substrate at said brazable layer.

9. The process of claim 1 further comprising bonding said cutting insert to a carbide substrate using an adhesive.

* * * * *